United States Patent
Shiver et al.

(10) Patent No.: US 8,060,076 B2
(45) Date of Patent: Nov. 15, 2011

(54) REAL-TIME RSL MONITORING IN A WEB-BASED APPLICATION

(75) Inventors: Brian Stuart Shiver, Rolesville, NC (US); Gregory Allan Liles, Apex, NC (US)

(73) Assignee: Harris Stratex Networks, Inc., Morrisville, NC (US)

(*) Notice: Subject to any disclaimer, the term of this patent is extended or adjusted under 35 U.S.C. 154(b) by 535 days.

(21) Appl. No.: 11/649,291

(22) Filed: Jan. 4, 2007

(65) Prior Publication Data
US 2008/0166972 A1    Jul. 10, 2008

(51) Int. Cl.
*H04W 24/00* (2009.01)
(52) U.S. Cl. .......... 455/423; 455/422.1; 455/403; 455/566
(58) Field of Classification Search ........... 455/115.1, 455/566, 404.2, 9, 456.1, 67.11, 423, 422.1, 455/403
See application file for complete search history.

(56) References Cited

U.S. PATENT DOCUMENTS

| | | | | |
|---|---|---|---|---|
| 5,230,087 A * | 7/1993 | Meyer et al. | | 455/67.11 |
| 5,444,851 A * | 8/1995 | Woest | | 709/222 |
| 6,055,431 A * | 4/2000 | Dybdal | | 455/450 |
| 6,088,717 A * | 7/2000 | Reed et al. | | 709/201 |
| 6,356,663 B1 * | 3/2002 | Korta et al. | | 382/239 |
| 6,470,188 B1 * | 10/2002 | Ohtani et al. | | 455/503 |
| 6,522,888 B1 * | 2/2003 | Garceran et al. | | 455/456.3 |
| 6,793,625 B2 * | 9/2004 | Cavallaro et al. | | 600/440 |
| 6,888,927 B1 * | 5/2005 | Cruickshank et al. | | 379/88.11 |
| 7,120,431 B1 * | 10/2006 | Huo et al. | | 455/423 |
| 7,130,757 B2 * | 10/2006 | Corwin et al. | | 702/127 |
| 7,272,359 B2 * | 9/2007 | Li et al. | | 455/67.13 |
| 7,596,373 B2 * | 9/2009 | McGregor et al. | | 455/425 |
| 2001/0018329 A1 * | 8/2001 | Tada et al. | | 455/39 |
| 2002/0093393 A1 | 7/2002 | Henningsson et al. | | |
| 2003/0070174 A1 * | 4/2003 | Solomon | | 725/98 |
| 2003/0162539 A1 * | 8/2003 | Fiut et al. | | 455/424 |
| 2003/0199283 A1 | 10/2003 | Busch | | |
| 2004/0137952 A1 * | 7/2004 | Umesh et al. | | 455/562.1 |
| 2005/0053008 A1 | 3/2005 | Griesing et al. | | |
| 2005/0073970 A1 * | 4/2005 | Davidson et al. | | 370/328 |
| 2005/0250440 A1 * | 11/2005 | Zhou et al. | | 455/12.1 |
| 2006/0112075 A1 | 5/2006 | Hellerstein et al. | | |
| 2006/0112175 A1 * | 5/2006 | Sellers et al. | | 709/223 |
| 2007/0167793 A1 * | 7/2007 | Dala-Krishna et al. | | 600/455 |
| 2007/0284430 A1 * | 12/2007 | Rock | | 235/375 |
| 2008/0051165 A1 * | 2/2008 | Burgan et al. | | 455/575.6 |

OTHER PUBLICATIONS

PCT International Search Report and Written Opinion dated Apr. 11, 2008 for International Application No. PCT/US07/88655.
PCT International Search Report and Written Opinion dated Jul. 7, 2008 for International Application No. PCT/US08/52359.

* cited by examiner

*Primary Examiner* — Kent Chang
*Assistant Examiner* — Ronald Eisner
(74) *Attorney, Agent, or Firm* — Sheppard Mullin Richter & Hampton LLP

(57) ABSTRACT

A system and method for monitoring an attribute of a received signal in a wireless network having plural radios wherein one of the radios includes a monitoring module operatively connected to a second network. An attribute of one radio is monitored substantially continuously at the monitoring module. A display device is operatively connected to the second network. A value representative of the current state of the attribute is transmitted via the second network to the display device upon a change in the state of the attribute from a previous state of the attribute, and the value is displayed on the display device.

29 Claims, 3 Drawing Sheets

REAL-TIME RSL MONITORING IN A WEB-BASED APPLICATION

BACKGROUND

Wireless network adjustment is a routine operation performed daily by wireless network operators to design a new wireless network or to optimize an existing network. Changes in a network may be made for many reasons including the need to improve coverage, quality of service, and capacity. Such changes are generally necessitated by many factors, including performance issues from customer complaints, field test data, switch or other network operational measurement, changing antenna setting requirements or constraints, including zoning, leasing or structural changes, increasing or shifting usage including movement of high usage areas. Depending upon the values of any of these factors, network engineers may be required to change antenna parameters to increase the capacity, coverage, and quality of service offered to users of the network. Network engineers may also be required to change antenna parameters to compensate for changes in environmental parameters determined by attributes of a received signal.

Antenna parameters may include any one or combination of antenna discrimination pattern, either by changing the antenna model or adjusting the discrimination parameters of an adjustable antenna, azimuth, mechanical down-tilt, electrical down-tilt, and twist, power, and changes in antenna height.

Presently, network engineers utilize a radio-frequency (RF) planning tool for determining required changes to a network. For each network change, the network engineer may be required to perform multiple steps of manually recording alternations in various configuration dialogs/tables, performing several network analysis steps, and generating and examining the results that indicate if the alteration(s) compensated for the changes in environmental parameters and/or increased the capacity, coverage, and quality of service. Network engineers may also employ a polling system to compensate for changes in environmental parameters. Typical prior art polling systems introduce lag because the systems request data every N seconds. Due to the delay between requests, a spike in received signal level (RSL) values or other signal attribute values may occur between polls, and there may not be an indication of this event. Thus, appropriate updates to the system may be lost and a full record of values cannot be captured and/or maintained.

It is apparent that the aforementioned processes are inefficient, inaccurate and time-consuming. Further, the processes may result in less than optimal network changes and a reluctance to utilize the full potential of available predictive tools. Therefore, a need exists for real-time monitoring of environmental parameters.

Accordingly, there is a need for a method and apparatus for a novel method and system that would overcome the deficiencies of the prior art. There is also a need for real-time RSL monitoring control. Therefore, an embodiment of the present subject matter provides a method for monitoring an attribute of a received signal in a wireless network having plural radios wherein one of the radios includes a monitoring module operatively connected to a second network. The method comprises the steps of monitoring substantially continuously an attribute of a radio at the monitoring module and providing a display device operatively connected to the second network. The method further comprises the steps of transmitting via the second network to the display device a value representative of the current state of the attribute wherein the transmitting occurs upon a change in the state of the attribute from a previous state of the attribute, and displaying the value on the display device.

Another embodiment of the present subject matter provides a system for monitoring an attribute of a received signal in a wireless network having plural radios. The system comprises a monitoring module operatively connected to a radio in the wireless network and operatively connected to a second network wherein the monitoring module substantially continuously monitors an attribute of the radio. A display device may be operatively connected to the second network. The monitoring module may transmit, via the second network to the display device, a value representative of the current state of the attribute wherein the monitoring module transmitter transmits upon a change in the state of the attribute from a previous state of the attribute.

These embodiments and many other objects and advantages thereof will be readily apparent to one skilled in the art to which the invention pertains from a perusal of the claims, the appended drawings, and the following detailed description of the embodiments.

DETAILED DESCRIPTION

With reference to the figures where like elements have been given like numerical designations to facilitate an understanding of the present subject matter, the various embodiments of a method and system for real-time monitoring of an attribute of a received signal are herein described.

Figure 1:
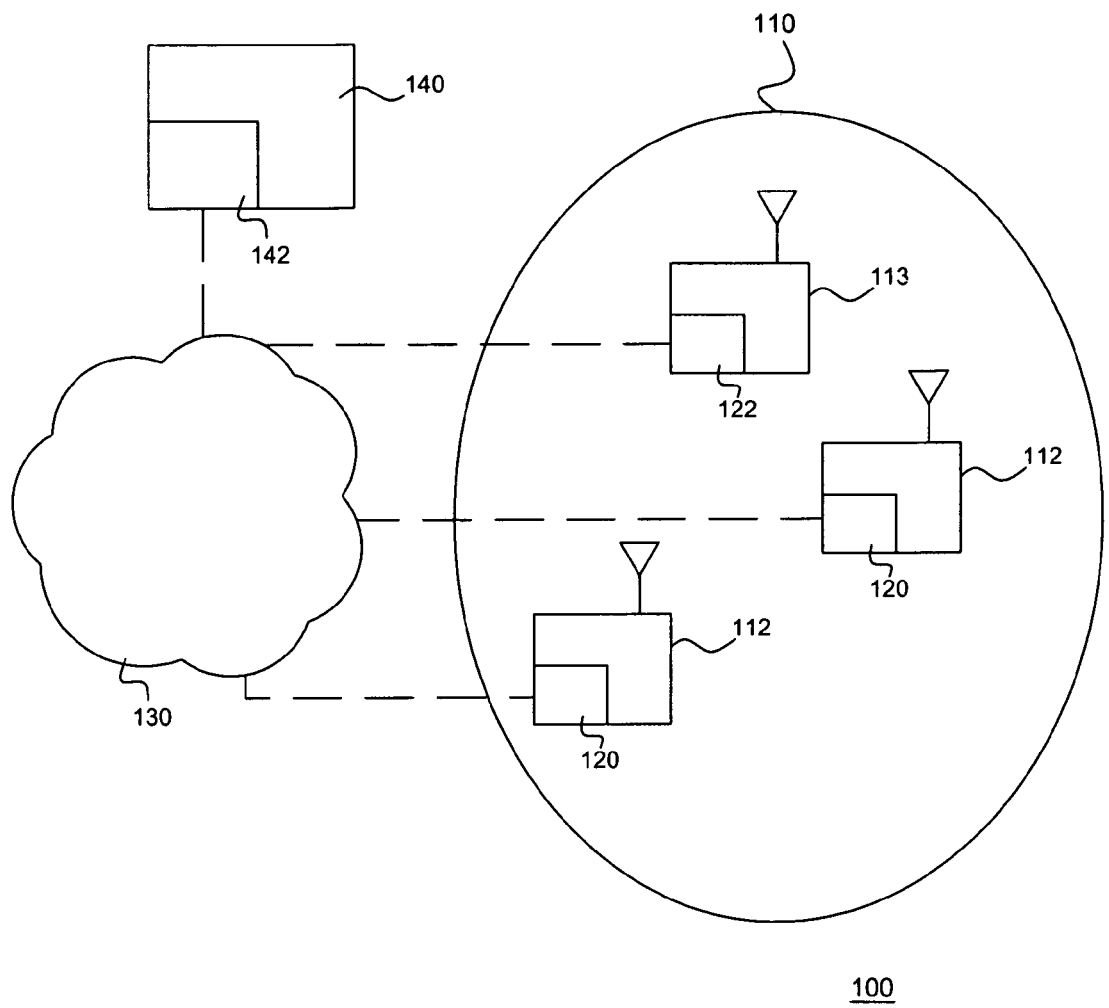
FIG. 1 is a schematic representation of a system according to an embodiment of the present subject matter.

FIG. 1 is a schematic representation of a system according to an embodiment of the present subject matter. With reference to FIG. 1, a system 100 is shown for monitoring an attribute of a received signal in a wireless network 110 having a plurality of radios 112. The system 100 may comprise at least one monitoring module 120 operatively connected to a radio 112 whereby the monitoring module 120 substantially continuously monitors an attribute or multiple attributes of the radio 112. The monitoring module 120 may also be operatively connected to a second network 130. The second network 130 may be the same as the wireless network 110 or may be a network independent of the wireless network 110. The second network 130 may support hypertext transfer protocol such as a private network, or the Internet. A display device 140 may also be operatively connected to the second network 130. The monitoring module 120 is adaptable to transmit a value representative of the current state of the attribute or multiple attributes via the second network 130 to the display device 140. The monitoring module 120 may transmit the value periodically, at predetermined intervals or upon a change in the state of the attribute from a previous state of the attribute. Attributes may be a received signal level of one radio or plural radios in the system 100. Of course, the attribute may also be, but is not limited to, signal to noise ratio, signal strength, carrier-to-noise ratio, bit error rate, transmitter power level, frequency range, wavelength range, and phase error.

Additional radios may be present in the wireless network 110 such as a second radio 113 that includes a second monitoring module 122 operatively connected to the second network 130. The second monitoring module 122 substantially continuously monitors an attribute or multiple attributes of the second radio 113. While not shown, any number of monitoring modules may be employed in the system and the examples described herein should not limit the scope of the claims appended herewith. Thus, the display device 140 may display attributes of either one radio 112, or a plurality of radios 112, 113.

The display device 140 may further include a communication module 142 for controlling communications with the monitoring module(s) 120 (122) via the second network 130 such that the monitoring module(s) 120 (122) transmits when the communication module 142 and the monitoring module(s) 120 (122) are communicating. Exemplary display devices 140 may support web browsers such as, but not limited to, Internet Explorer, Netscape, FireFox, etc. The web browser may present a graphical user interface (GUI) capable of displaying the value representative of the current state of the attribute or multiple attributes. The display device 140 may also display a graphical representation of the value and/or a numerical representation of the value. While not illustrated, the display device 140 may further include a processor, database or other memory means to store these values. Thus, the display device 140 may display real-time values and/or historical graphs of stored values in a single graph or in multiple graphs and may provide any number of selectable combinations of stored values and/or attributes therefrom. For example, ones of the stored values displayed in a first graph may be stored periodically and the current state of the value displayed in a second graph may be updated upon a change in the state of the attribute from a previous state of the attribute. The system 100 may further comprise an alarm that may be activated if any one of the values is outside a predetermined range.

Figure 2:
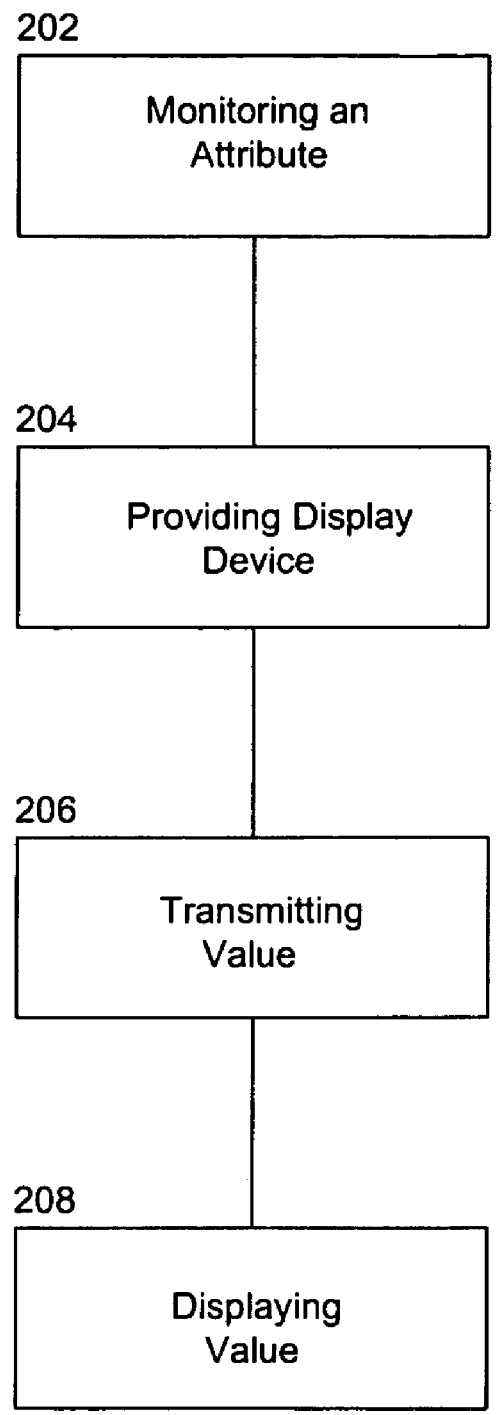
FIG. 2 is a flowchart illustrating a method for monitoring an attribute of a received signal according to an embodiment of the present subject matter.

FIG. 2 is a flowchart illustrating a method for monitoring an attribute of a received signal according to an embodiment of the present subject matter. With reference to FIG. 2, in step 202, an attribute of at least one radio in a wireless network including plural radios is monitored substantially continuously at a monitoring module. The attributes may be a received signal level of one radio or plural radios present in the wireless network. Of course, the attribute may also be, but is not limited to, signal to noise ratio, signal strength, carrier-to-noise ratio, bit error rate, transmitter power level, frequency range, wavelength range, and phase error. The monitoring module may be operatively connected to a second network. The second network may be the same as the wireless network or may be a network independent of the wireless network. The second network may also support hypertext transfer protocol such as a private network or the Internet.

In step 204, a display device is provided operatively connected to the second network. The display device may control communications with the monitoring module via the second network. The display device may also be adaptable to support a web browser which presents a GUI capable of displaying the value representative of the current state of the attribute or multiple attributes. The display device provides a graphical representation and/or a numerical representation of the value, and may include a processor, database or other memory means to store the values.

In step 206, a value representative of the current state of the attribute is transmitted via the second network to the display device. The transmitting may occur upon a change in the state of the attribute form a previous state of the attribute or may occur when the communication module and the monitoring module are communicating. In step 208, the value may then be displayed on the display device. An alternative embodiment of the present subject matter may include the step of storing ones of the values and displaying each of the stored values so as to view a history of the values. The values may be stored periodically, by event, or at user-defined periods. A further embodiment of the present subject matter may include the step of initiating an alarm if a value is outside a predetermined range.

Figure 3:
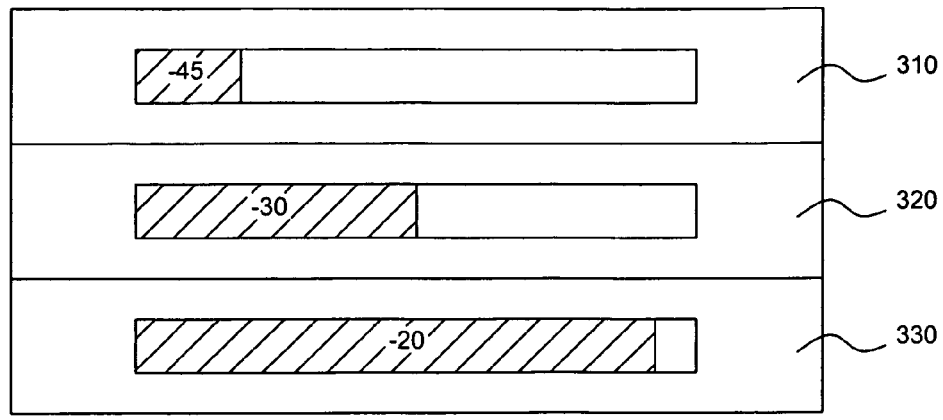
FIG. 3 is a representation of graphical displays according to embodiments of the present subject matter.

FIG. 3 is a representation of graphical displays according to embodiments of the present subject matter. With reference to FIG. 3, one form of a graphical display may be represented as a horizontal bar that characterizes an RSL range. The range may be color-coded to indicate what portions of the range correspond to acceptable values and what portions may be cause for alarm. For example, current RSL values may be graphically and/or numerically indicated in a low range 310, a normal range 320, or a high range 330. Of course, any number of indications may be provided by the graphical display on the display device and such examples should not limit the scope of the claims appended herewith. The range values and control thereof may be configurable and or user-defined. For example, a user may control the range and listing of RSL values via a right-click menu (not shown).

Figure 4:
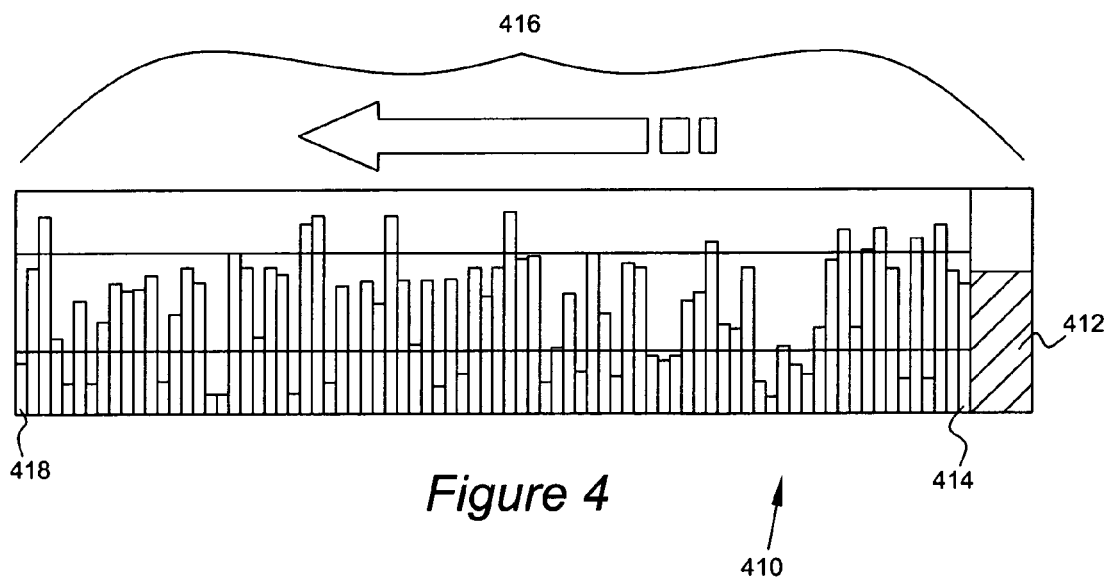
FIG. 4 is a representation of a graphical display according to another embodiment of the present subject matter.

FIG. 4 is a representation of a graphical display according to another embodiment of the present subject matter. With reference to FIG. 4, a display device may be switched to a mode adaptable to store plural RSL values or other values representative of attributes of the network. This mode may provide an historical graphical display 410 showing values over time. For example, the graphical display 410 may comprise a first portion 412 providing an indication of real-time RSL values. Such an indication may be a vertical or horizontal bar. As shown, other RSL values measured in the past 414 are shifted to the left as updated real-time RSL values are indicated. Thus, as new entries are provided, the historical values are cascaded down the graphical display 410 to represent RSL values over a predetermined time period 416. As RSL values continue to be measured and provided on the graphical display 410, older values 418 may eventually be deleted from the display depending upon the time period shown. Of course, any time period or portion thereof may be stored in memory as a CSV file, XML file, etc. The graphical display 410 may employ user-definable graph update intervals and user-definable minimum and maximum RSL thresholds. Further, the graphical display 410 may employ user-clearable RSL threshold alarms and user-definable log file entry limits.

It is also an aspect of the present subject matter that data or value entries may consist of RSL value changes or deltas. For example, if the value of RSL is maintained over a half-hour period, there will be one entry at the beginning of that period. Such a format may efficiently utilize memory and the granularity thereof may be defined such that no change in RSL value is missed.

Embodiments of the present subject matter provide monitoring control of RSL information both numerically and graphically. The monitoring control may be provided for logging RSL values over time, by event or periodically. Data and values may be saved in various formats that can be loaded and analyzed by a plurality of known applications such as, but not limited to, Microsoft Excel. The monitoring control may be established upon a web-based event driven data channel to thereby receive updates to RSL values as they occur.

A system according to one embodiment of the present subject matter comprises a monitoring module operatively connected to a radio in a wireless network and operatively connected to a second network wherein the monitoring module may substantially continuously monitor an attribute of the radio. The system further comprises a display device operatively connected to the second network. The monitoring module transmits, via the second network to the display device, a value representative of the current state of the attribute where the monitoring module transmitter transmits upon a change in the state of the attribute from a previous state of the attribute. In an additional embodiment of the present subject matter the second network may be the same network as the wireless network or may be independent of the wireless network. In a further embodiment of the present subject matter the display device may further include a communication module for controlling communications with the monitoring module via the second network, and may include a memory capable of storing ones of the values. Thus, the display device is adaptable to display graphs including each of the stored values as well as a graph showing the current state of the value. In an alternative embodiment of the present subject matter the system a second of the radios may include a second monitoring module operatively connected to the second network where the second monitoring module substantially continuously monitors an attribute of the second radio. Of course, the display device may also display attributes of both the first and second radios.

A method according to another embodiment of the present subject matter may comprise the steps of monitoring substantially continuously an attribute of said at least one radio in a wireless network wherein the radio includes a monitoring module operatively connected to a second network, and providing a display device operatively connected to the second network. The method may further comprise transmitting via the second network to the display device a value representative of the current state of the attribute wherein the transmitting occurs upon a change in the state of the attribute from a previous state of the attribute, and displaying the value on the display device. The displaying may further include displaying a graphical representation of the value and a numerical representation of the value. An alternative embodiment of the present subject matter may comprise the step of storing ones of the values and displaying each of the stored values so as to view a history of the values. A further embodiment of the present subject matter may also comprise the step of initiating an alarm if the value is outside a predetermined range.

As shown by the various configurations and embodiments illustrated in FIGS. 1-4, a method and system for real-time monitoring of an attribute of a received signal have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for monitoring an attribute of one of a plurality of radios in a wireless network, the method comprising:
    monitoring substantially continuously the attribute of said one of said plurality of radios at a monitoring module in said one of said plurality of radios, the monitoring module operatively connected to a second network independent of the wireless network;
    providing a display device operatively connected to said second network;
    controlling communications with said monitoring module via said second network using a communication module operatively connected to said display device;
    transmitting via said second network to said display device a value representative of the current state of said attribute wherein the transmitting occurs upon a change in the state of said attribute from a previous state of said attribute;
    determining changes in an environmental parameter of said one of said plurality of radios using the state of said attribute and the previous state of said attribute;
    displaying a value associated with changes in the environmental parameter on said display device; and
    changing antenna parameters to compensate for changes in the environmental parameter.

2. The method of claim 1 wherein said second network is a network supporting hypertext transfer protocol.

3. The method of claim 2 wherein said second network is a private network.

4. The method of claim 2 wherein said second network is the Internet.

5. The method of claim 1 wherein said attribute is a received signal level of said one of said plurality of radios.

6. The method of claim 1 wherein said attribute is selected from the group consisting of: signal to noise ratio, signal strength, carrier-to-noise ratio, bit error rate, transmitter power level, frequency range, wavelength range, and phase error.

7. The method of claim 1 wherein said display device is adaptable to support a web browser.

8. The method of claim 7 wherein said web browser presents a graphical user interface ("GUI") capable of displaying said value.

9. The method of claim 7 wherein said displaying includes displaying a graphical representation of said value and a numerical representation of said value.

10. The method of claim 7 further comprising storing ones of said values and displaying each of said stored values so as to view a history of said values.

11. The method of claim 10 wherein said storing occurs periodically.

12. The method of claim 1 further comprising initiating an alarm if said value is outside a predetermined range.

13. A system for monitoring an attribute of one of a plurality of radios in a wireless network, the system comprising:
    a monitoring module operatively connected to said one of said plurality of radios, the monitoring module operatively connected to a second network independent of the wireless network, wherein said monitoring module substantially continuously monitors the attribute of said one of said plurality of radios; and
    a display device operatively connected to said second network, wherein said display device includes a communication module for controlling communications with said monitoring module via said second network;
    wherein said monitoring module is operative to transmit, via said second network to said display device, a value representative of the current state of said attribute;
    wherein said monitoring module is operative to transmit upon a change in the state of said attribute from a previous state of said attribute;
    wherein said monitoring module is operative to determine changes in an environmental parameter of said one of said plurality of radios using the state of said attribute and the previous state of said attribute;

wherein said display device is operative to display a value associated with changes in the environmental parameter;

the monitoring module configured to facilitate changing antenna parameters to compensate for changes in the environmental parameter.

14. The system of claim 13 wherein said second network is a network supporting hypertext transfer protocol.

15. The system of claim 14 wherein said second network is a private network.

16. The system of claim 14 wherein said second network is the Internet.

17. The system of claim 13 wherein said attribute is a received signal level of said one of said plurality of radios.

18. The system of claim 13 wherein said attribute is selected from the group consisting of: signal to noise ratio, signal strength, carrier-to-noise ratio, bit error rate, transmitter power level, frequency range, wavelength range, and phase error.

19. The system of claim 13 wherein said display device is adaptable to support a web browser.

20. The system of claim 19 wherein said web browser presents a graphical user interface ("GUI") capable of displaying said value.

21. The system of claim 19 wherein said display device displays a graphical representation of said value and a numerical representation of said value.

22. The system of claim 19 wherein the display device comprises a memory capable of storing ones of said values and said display device displays a first graph including each of said stored values.

23. The system of claim 22 wherein said display device also displays a second graph showing the current state of said value.

24. The system of claim 23 wherein ones of said stored values displayed in said first graph are stored periodically and said current state of said value displayed in said second graph is updated upon a change in the state of said attribute from a previous state of said attribute.

25. The system of claim 13 further comprising an alarm which is activated if said value is outside a predetermined range.

26. The system of claim 13 wherein a second of said plurality of radios includes a second monitoring module operatively connected to said second network and said second monitoring module substantially continuously monitors an attribute of said second of said plurality of radios.

27. The system of claim 26 wherein said display device displays said attribute of said one of said plurality of radios and said attribute of said second of said plurality of radios.

28. The method of claim 1 wherein said transmitting is performed even if said communication module and said monitoring module were not communicating when the change in the state of said attribute occurred.

29. The system of claim 13, wherein said monitoring module is configured to transmit upon a change in the state of said attribute even if said communication module and said monitoring module were not communicating when the change in the state of said attribute occurred.

* * * * *